Nov. 10, 1953 R. H. GUICHARD 2,658,386
HYDROSTATIC TEST UNIT
Filed Sept. 29, 1949
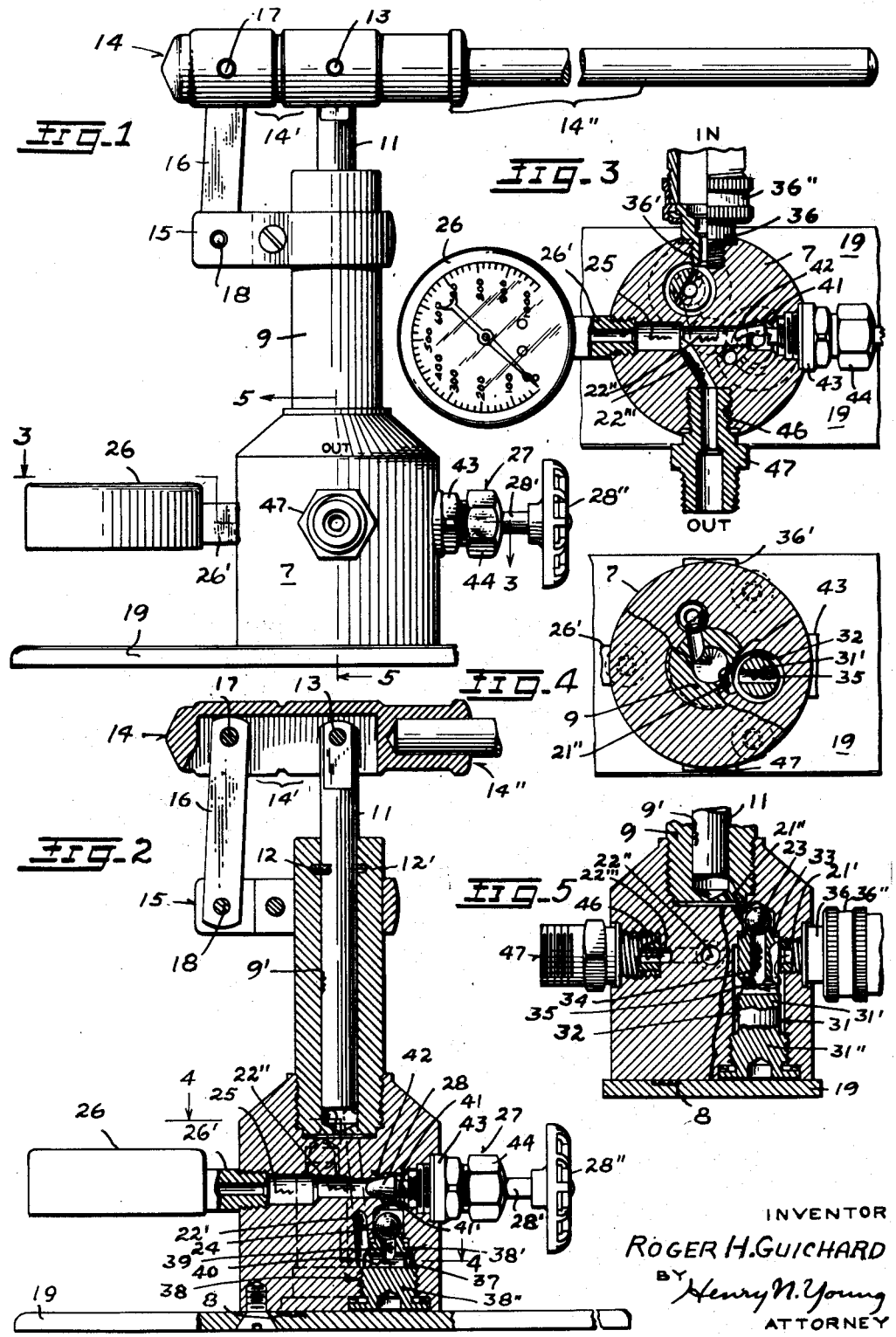
INVENTOR
ROGER H. GUICHARD
BY
Henry N. Young
ATTORNEY Patented Nov. 10, 1953

2,658,386

UNITED STATES PATENT OFFICE 2,658,386

HYDROSTATIC TEST UNIT

Roger H. Guichard, Walnut Creek, Calif.

Application September 29, 1949, Serial No. 118,492

2 Claims. (Cl. 73—37)

1

The invention relates to a device for effecting a hydrostatic pressure-testing of closed systems or containers for leakage and/or structural strength.

An object of the invention is to provide a testing unit which provides a pump and a gauge and the necessary valves in a single assembly.

Another object is to provide a unit of the character described which may be disconnected from a source of testing liquid while it remains operatively connected with a system being tested, and, in itself, may positively hold the testing pressure.

A further object is to provide a generally improved and readily used test unit of the character described.

The invention possesses other objects and features of advantage, some of which, with the foregoing, will be set forth or be apparent in the following description of a typical embodiment thereof, and in the accompanying drawings, in which, Figure 1 is an external elevation of a testing unit embodying my invention.

Figure 2 is an axial sectional elevation of the unit.

Figure 3 is a partly sectional view taken on the line 3—3 in Figure 1.

Figure 4 is a plan section taken on the stepped line 4—4 in Figure 2.

Figure 5 is a fragmentary upright section taken on the line 5—5 in Figure 1.

As particularly illustrated, the working parts of my testing unit are provided in or on a one-piece cylindrical body block 7 which has a bottom end, or base, face 8, and unitarily mounts a pump cylinder 9 extending axially upwardly from it and having its bore uniform and open at the top. The bottom of the cylinder 9 is threadedly fixed in a complementary socket provided at the top of the block 7 and comprises, in effect, an integral extension of the block. The cylindrical bore 9' of the cylinder 9 slidably and complementarily receives a member 11 of uniform diameter which has its inner (lower) end portion operative as a piston in the cylinder and otherwise functions as a piston rod. A suitable sealing ring 12 for the member 11 is mounted in an annular groove 12' provided at an upper point of the cylinder bore.

At its upper end, the piston 11 is intermediately connected by a pivot pin 13 with a hand lever 14 having arm and handle portions 14' and 14" at opposite sides of the pin 14, the arm portion 14' being relatively short. A bracket arm 15 of

2 the clamp-on type is mounted on the cylinder 9 at an upper point thereof and has its outer end connected by a link 16 with the arm 14' end connected by a link 16 with the arm 14' by means of pivot pins 17 and 18 respectively engaged in the arm 14' and the arm 15, whereby a rocking of the handle 14" in an upright plane including the block axis may reciprocate the member 11 in the cylinder bore as a pumping means of the unit. An elongated foot-plate 19 of suitable length is fixed to the block 7 against its bottom face 8 and extends beneath the zone of action of the handle 14" to provide a steadying base which may be stood on by an operator while the pump is being actuated.

It will now be noted that the block 7 essentially provides therethrough a fluid intake duct or passage, designated in the drawings by parts 21' and 21" thereof, leading from a side connection to the inner end of the cylinder cavity, and a discharge duct or passage, designated in the drawings by parts 22' and 22" and 22''', leading from the cylinder cavity to a connection at an opposite side point of the body. A ball valve 23 (Fig. 5) is operative as a check valve in the intake duct to permit a flow of liquid solely to the cylinder while a ball valve 24 (Fig. 2) is operative as a check valve in the discharge duct to prevent a return flow of fluid to the cylinder through the latter duct. Beyond the ball valve 24 therein, the duct 22 is provided with a branch 25 extending to a side point of the block 7 for the connection of a pressure gauge 26 with the duct 22, and a hand valve 27 has a conical plug 28 operative as a needle valve at a complementary seat therefor provided in the duct 22 between the duct 25 and the ball valve 24. The arrangement is essentially such that a suction (up) stroke of the pump piston is arranged to draw a testing fluid into the cylinder past the ball valve 23, and the succeeding working (down) stroke of the piston is arranged to force the fluid past the ball 24 into and from the duct 22, provided the plug 28 of the valve 27 is unseated.

As the hand lever 14 of the pump is repetitively actuated, the pumped fluid will build up any desired pressure in a system to be pressure-tested with the fluid, the gauge 26 constantly indicating the pressure existing in the system. When a desired pressure has been built up in the system being tested, the closing of the hand valve 27 will positively prevent a return of fluid from the system while leaving the gauge 26 fully operative to indicate the maintenance of, or loss of, pressure in the system, a lowering of the pressure indicating leakage from the system.

While the solely pressure-seated check ball 24 might generally maintain the testing pressure which has been built up, the provision and use of the positively settable hand valve 27 is preferable for positively preventing any relief of pressure through the unit to assure an accurate determination respecting the maintenance of the pressure in the system.

By particular reference to Figures 4 and 5, it will be noted that the seat for the intake check ball 23 is provided at the upper end of a reduced portion 31' of a member 31 having a base portion 31'' threadedly engaged in the outer portion of a cylindrical cavity 32 which extends into the block 7 from its base face 8, the bottom end of the member being countersunk in the block end to provide for mounting the foot-plate 19 thereacross. The cavity 32 is stepped inwardly just above the inlet end of the intake duct 21 to provide a bore portion which snugly receives the portion 31' of the member 31, the latter portion being smaller than the cavity bore portion beneath it to provide an annular fluid-receiving space about the portion. Slightly above the first said step therein, the bore of the cavity 32 is again stepped inwardly to provide a radial seat 33 against which a complementary shoulder of the stem 31' is arranged to be sealedly seated. The cavity 32 extends beyond the seat 33 to intersect the duct 21 and to cooperate with the upper end of the portion 31' to provide a cage space in which the ball 23 is enclosed for its normal seating upon the inner end of the stem.

The bore 34 of the portion 31' of the member 31 extends upwardly from a diametric hole 35 provided through the portion, and the arrangement is essentially such that the ball 23 may be unseated by fluid pressure within the space about the stem, fluid being supplied to said space through an outer portion 21' of the duct 21 at which fluid-supply connections are provided; as particularly shown, a threaded stem portion 36' of a member 36 of a hose coupling is sealedly engaged in the duct portion 21', and mounts a hose-connecting ring 36'' of the coupling in swivelled relation to it. It will be understood that fluid introduced through the connection will pass through the duct portion 21' into the space of the cavity 32 about the portion 31' of the member 31, through the hole 35 into the bore 34 of the portion 31', and past the ball 23 through an inner portion 21'' of the duct 21 to the cylinder space.

It will now be noted that an inner portion 22' of the duct 22 extends from the inner end of the cylinder space to a cylindrical cavity 37 which extends into the block 7 from the bottom thereof, and has a member 38 mounted therein. A base portion 38' of the member 38 threadedly engages a bottom portion of the cavity 37, and has a reduced tubular portion 38'' of the member extending into the cavity therefrom, said latter portion being of smaller diameter than the cavity bore portion thereat to define an annular space in the cavity at which the inner portion of the duct 22 terminates.

Above said annular space in the cavity 37, the bore of the cavity is stepped inwardly to closely receive the portion 38' of the member 38 and is again stepped inwardly laterally of the seat for the ball 24 at the top of the portion, the inner end of the bore and said seat cooperatively providing a cage for the ball. The axial bore 39 of the portion 38' extends from the ball seat at its extremity to a cross-hole 40 provided through the stem at the annular space defined within the cavity opposite the stem, the arrangement being such that fluid discharged from the pump cylinder 9 may flow through the inner part of the duct 22 into said annular cavity space, and thence through the hole 40 and bore 39 past the ball 24 and into the ball cage space.

By particular reference to Figures 2 and 3, it will now be noted that a straight hole of different sizes therealong is provided diametrically through the block 7, passes above the cavity 37, has a central portion 22'' comprising a portion of the discharge duct 22, has an end portion comprising the branch duct 25, and has the valve 27 provided at its other end portion 41. An outwardly-directed valve seat 42 for the valve plug 28 is provided at the juncture of the hole portions 22'' and 41, the plug 28 is movable to and from the seat 42 in a clear space of the hole portion 41, and has its valve stem 28' threadedly engaged in a bonnet member 43 which is in turn threadedly fixed in an enlarged outer part of the hole portion 41 and mounts a usual stuffing box 44 for the stem. The outer end of the stem 28' carries a hand wheel 28'' by which the stem may be rotated to seat and unseat the valve plug 28. The part of the hole portion 41 in which the valve plug 28 is freely operative is connected by a short duct 41' with the cage space for the ball 24 whereby the plug 28 is operative to control the flow of fluid into the duct portion 22''. The outer end portion of the duct 25 threadedly receives a tubular mounting stem 26' of the gauge 26 whereby the gauge indications are governed by the pressure beyond the valve plug 28. An outer portion 22''' of the discharge duct extends generally radially from the portion 22'' to a socket 46 at which a suitable pipe connection member 47 is mounted for use in connecting the present unit to a system (not shown) to be pressure-tested.

While the present unit has been particularly designed for the use of water, or another liquid, for its testing use, it will be understood that the unit is readily adaptable for the use of a gas as a testing fluid. Closed pipe systems to be tested include those for water and sewage and gases and other fluids, and a present unit may also be used for testing containers, such as tanks and boilers, for strength and/or leakage. Furthermore, it will be noted that the gauge stem 26' and the valve stem 28' are coaxial in a diametric line of the block 7, and that the axes of the connections 36 and 47 are coaxial in a line diametric of the block 7 and perpendicularly intersecting the line of the stems 26' and 28' whereby to provide a unit of minimum height and of which the extending elements are independently accessible during the installing or use or disconnecting of the unit.

From the foregoing description taken in connection with the accompanying drawings, the advantages of the present hydrostatic test unit will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims:

1. In a hydrostatic high-pressure pressure-test unit for a closed system of relatively high volumetric capacity, a one-piece homogeneous body block mounting a pump cylinder, a piston reciprocative in said cylinder, means mounted on the block for actuating said piston in suction and pressure strokes thereof, a suction intake duct extending to the cylinder solely through and within the block from an exterior point of the block, a check valve operative in said intake duct, means for constantly connecting the inlet end of the intake duct at said exterior block point with a source of liquid external to the unit, a discharge duct from the cylinder extending solely through and within the block to a second exterior point thereof, a check valve operative in said discharge duct, means mounted on the block exterior for directly connecting the outlet end of the discharge duct with the closed system to be pressure-tested, and a pressure gauge mounted entirely and directly on the block and connected with the discharge duct by a branch thereof within the block and at the discharge side of the check valve therein for constantly gauging the pressure in a closed system under test.

2. A hydrostatic high-pressure pressure-test unit for a closed system of relatively high volumetric capacity comprising, a one-piece homogeneous body block of cylindrical outline mounting a pump cylinder axially thereof, a piston reciprocative in said cylinder, means mounted on the block for actuating said piston in suction and pressure strokes thereof, a suction intake duct extending to the cylinder solely through the block from an exterior side point of the block, a check valve within said intake duct, means for directly and constantly connecting the inlet end of the intake duct with a source of liquid external to the unit, a discharge duct from the cylinder extending solely through the block to a second exterior side point thereof, a check valve operative within said discharge duct, a pressure gauge mounted at a third exterior side point of the body block and connected with the discharge duct at a point within the block and at the discharge side of the check valve, a shut-off valve operative in the discharge duct at a point within the body and between the check valve and the gauge connection therein, and means on the body for releasably connecting the outlet end of the discharge duct with the closed system to be pressure-tested.

ROGER H. GUICHARD.

References Cited in the file of this patent

UNITED STATES PATENTS

| Number | Name | Date |
|---|---|---|
| 677,776 | Devantery | July 2, 1901 |
| 1,027,834 | Fulmer | May 28, 1912 |
| 1,543,989 | Deck | June 30, 1925 |
| 1,706,567 | Dezendorf | Mar. 26, 1929 |
| 2,183,189 | Gormley | Dec. 12, 1939 |
| 2,446,219 | Eaton | Aug. 3, 1948 |

FOREIGN PATENTS

| Number | Country | Date |
|---|---|---|
| 404,107 | Great Britain | Jan. 11, 1934 |